(12) United States Patent
Deppe et al.

(10) Patent No.: US 7,768,211 B2
(45) Date of Patent: Aug. 3, 2010

(54) METHOD AND CIRCUIT ARRANGEMENT FOR OPERATING A HIGH-PRESSURE GAS DISCHARGE LAMP

(75) Inventors: Carsten Deppe, Aachen (DE); Holger Mönch, Vaals (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 328 days.

(21) Appl. No.: 11/569,722

(22) PCT Filed: Jun. 3, 2005

(86) PCT No.: PCT/IB2005/051815

§ 371 (c)(1), (2), (4) Date: Jul. 9, 2008

(87) PCT Pub. No.: WO2005/120138

PCT Pub. Date: Dec. 15, 2005

(65) Prior Publication Data

US 2008/0258638 A1    Oct. 23, 2008

(30) Foreign Application Priority Data

Jun. 3, 2004 (EP) .................................. 04102484

(51) Int. Cl.
*H05B 37/00* (2006.01)
(52) U.S. Cl. ................ 315/194; 315/246; 315/307
(58) Field of Classification Search ............ 315/291, 315/246, 250, 307, 308, 312, 194
See application file for complete search history.

(56) References Cited

U.S. PATENT DOCUMENTS 5,262,701 A 11/1993 Derra et al.
5,608,294 A 3/1997 Derra et al.
5,706,061 A 1/1998 Marshall et al.
2002/0140910 A1 10/2002 Stark et al.
2008/0111975 A1* 5/2008 Okamoto et al. .............. 353/85

FOREIGN PATENT DOCUMENTS

| DE | 10319571 A1 | 11/2004 |
| EP | 0752785 A2 | 1/1997 |
| EP | 1154652 A2 | 11/2001 |
| EP | 1460855 A1 | 9/2004 |
| WO | WO9511572 A1 | 4/1995 |
| WO | WO2004016000 A1 | 2/2004 |

OTHER PUBLICATIONS

International Search Report of International Application No. PCT/IB2005/051815 Contained in International Publication No. WO2005120138.
Written Opinion of the International Searching Authority for International Application No. PCT/IB2005/051815.

* cited by examiner

*Primary Examiner*—David Hung Vu

(57) ABSTRACT

A description is given of a method and a circuit arrangement for operating a high-pressure gas discharge lamp with a lamp current superposed with first current pulses, in particular in a system for the time-sequential production of (primary) colors and possibly white segments, from which an image to be displayed is synthesized, in which, in order to change or correct color and/or brightness properties of the image, the first current pulses are adjusted with regard to their amplitude and/or temporal length and/or temporal position relative to the production of the colors and/or white segments. A description is also given of a projection system comprising such a circuit arrangement.

7 Claims, 3 Drawing Sheets

METHOD AND CIRCUIT ARRANGEMENT FOR OPERATING A HIGH-PRESSURE GAS DISCHARGE LAMP

CROSS-REFERENCE TO RELATED APPLICATIONS

This application is a national stage application under 35 U.S.C. §371 of International Application No. PCT/IB2005/051815 filed on Mar. 6, 2005, and published in the English language as International Publication No. WO/2005/120138 on Dec. 15, 2005, which claims priority to European Application No. 04102484.5, filed on Mar. 6, 2004, incorporated herein by reference.

FIELD OF INVENTION

The invention relates to a method and a circuit arrangement for operating a high-pressure gasdischarge lamp (HID lamp or UHP [ultra-high-performance] lamp) with a lamp current superposed with first current pulses, in particular in a system for the time-sequential production of primary colors and possibly white segments, and in particular for illuminating projection displays with the time-sequential displaying of primary color images, such as for example in DLP® (digital light processing) systems or LCoS (liquid crystal on silicon) systems. The invention furthermore relates to such a projection system for displaying images or data, comprising a high-pressure gas discharge lamp and such a circuit arrangement.

BACKGROUND OF THE INVENTION

In projection systems, the light source used is usually one or more high-pressure gas discharge lamps (HID lamp or UHP [ultra-high-performance] lamp). These lamps can in principle be operated both with DC current and with AC current. Usually, however, operation with AC current is preferred since this prevents rapid erosion of the electrodes and increases the efficiency of the lamp.

However, particularly in the case of operation with an AC current, the risk of unstable arc discharges also increases on account of the polarity change, and these arc discharges may lead to flickering of the output light current. This is based essentially on the fact that the arc discharge is dependent on the temperature and the condition of the surface of the electrodes, and moreover the temporal courses of the electrode temperature differ in the phases in which the electrode acts as anode and as cathode. This in turn leads to the fact that the electrode temperature changes considerably during one period of the lamp current. In order to favorably influence these fluctuations, a (first) current pulse having the same polarity as the half-period to be changed is generated at the end of each half-period of the lamp current, i.e. prior to a change in polarity, and this current pulse is superposed on the lamp current so that the overall current increases and the electrode temperature rises. As a result, the stability of the arc discharge can be considerably improved.

These first current pulses lead to the lamp being operated with an AC lamp current which has more or less pronounced pulsed components which in turn give rise to a correspondingly pulsed increased light current.

Particularly in color projection displays which operate by means of time-sequential color display methods, fluctuations in the output light current may have a disruptive effect when one of the primary color images is displayed at a different brightness than the other primary color images.

In such a time-sequential color display method, the color image is produced on the display by the time-sequential displaying of at least three complete images in each case in one of the three primary colors ("field sequential color") blue, green and red and possibly a fourth white image (white segment). This method is currently used for example in most DLP® (digital light processing) projectors (which operate with one color wheel) and in future may also be used in LCoS systems in which at present prisms and in future a drum-like arrangement are used for the time-sequential illumination of the display with the primary colors.

In order to prevent the increase in the light current which is brought about by the first current pulses from leading to a color shift in the displayed image, the current pulse generation and color modulator are usually synchronized with one another as explained in EP 1 154 652 in such a way that the first current pulses always occur in the fourth white image.

For operation of the lamp and the technical circuit design of the lamp driver, the absolute value of the amplitude of the first current pulse (and not the relative level thereof compared to the mean lamp current) is furthermore to be set and kept as constant as possible. Since, however, the operating voltage rises in many cases (or possibly also drops) during the service life of the lamp and thus the mean current in the lamp decreases, the ratio between the amplitude of the first current pulses and the mean current becomes increasingly large. This in turn means that the component of white light in the overall image becomes increasingly high and the color saturation thus becomes increasingly low. Although this effect could be compensated by measuring the current levels and calculating a correction, this would mean that the image brightness decreases quite considerably as the lamp becomes older. (The opposite effect occurs if in certain lamps the operating voltage drops over the course of the service life.)

SUMMARY OF THE INVENTION

It is an object of the invention therefore to provide a method and a circuit arrangement for operating a high-pressure gas discharge lamp, by means of which the abovementioned problems can be at least largely avoided and at least substantially constant color and/or brightness properties of a displayed image can be achieved during the service life of the lamp.

Furthermore, it is also an object of the invention to provide a method and a circuit arrangement for operating a high-pressure gas discharge lamp, by means of which a considerably better color balance can be achieved in the overall image than with known methods and circuit arrangements, and this color balance can moreover be at least largely maintained during the entire service life of the lamp.

It is also an object of the invention to provide a method and a circuit arrangement for operating a high-pressure gas discharge lamp, by means of which a change or adjustment or correction of the color and/or brightness properties, particularly the color temperature of the image, can be carried out without a noticeable loss of light.

It is also an object of the invention to provide a method and a circuit arrangement for operating a high-pressure gas discharge lamp, by means of which the color saturation and/or the brightness of a displayed image can be adapted in particular automatically to the color saturation and/or brightness of a present image content, in order for example to illuminate a projection display in such a way that a desired, particularly high color saturation is obtained in a first operating mode (e.g.

for video operation) and a desired, particularly high brightness is obtained in a second operating mode (e.g. for presentation purposes).

This object is achieved as claimed in claim 1 by a method of operating a high-pressure gas discharge lamp with a lamp current superposed with first current pulses, in particular in a system for the time-sequential production of primary colors and possibly white segments, from which an image to be displayed is synthesized, in which, in order to change or correct color and/or brightness properties of the image, the first current pulses are adjusted with regard to their amplitude and/or temporal length and/or temporal position (phase) relative to the production of the colors and/or white segments.

At this point, it should be mentioned that a circuit arrangement which can be used to operate a sodium high-pressure gas discharge lamp with current pulses with a controllable duty cycle is known from U.S. Pat. No. 5,262,701. However, this circuit arrangement is provided for dimmed operation of the lamp, in which, by changing the duty cycle, a change in the power supplied to the lamp takes place and at the same time a specific color temperature of the produced light is said to be achieved or not undershot. Since, however, neither the dimmed operation nor the influencing of the color temperature of the light emitted by the lamp forms the subject matter of the invention, said document is not to be regarded as relevant.

Particular advantages of the solution according to the invention are that the lamp current may be both a DC current and an AC current. Furthermore, the color temperature and/or the image brightness can be set or adjusted largely without any losses, i.e. without noticeable losses of light, so that a high efficiency and lumen output is achieved by the pulsed lamp current. Finally, the lamp current superposed with the pulses can be generated in a simple manner in time-sequential display systems, where necessary even without a white segment.

The dependent claims contain advantageous embodiments of the invention.

The embodiment as claimed in claim 2 is provided for the case in which the lamp current is an AC current.

By virtue of the embodiments as claimed in claims 3 and 4, further optimization of the color and/or brightness properties of a displayed image is possible.

The embodiment as claimed in claim 5 can advantageously be used in particular for LCoS systems.

The embodiment as claimed in claim 6 is particularly advantageous for a video mode of the relevant projection system, whereas the embodiment as claimed in claim 7 is particularly suitable for presentation purposes.

By virtue of the embodiment as claimed in claim 8, an automatic changeover between the operating modes described in claims 6 and 7 and thus a dynamic adaptation of the color and/or brightness properties of the displayed image to the present image content is possible.

BRIEF DESCRIPTION OF THE DRAWINGS

The invention will be further described with reference to examples of embodiments shown in the drawings to which, however, the invention is not restricted.

DETAILED DESCRIPTION OF THE EMBODIMENTS OF THE INVENTION

It will be assumed below that the lamp is operated with an essentially square-wave AC current. The described current pulses may however also be superposed on a DC lamp current, so that the principle according to the invention can also be applied in this case.

In a first embodiment of the invention, the first current pulses, which are superposed on the AC lamp current, prior to a polarity change, with the same polarity as the phase or period to be changed, are shifted temporally in the color segments or (primary) colors and possibly in the white segments as a function of specific parameters, such as for example a present operating voltage (which may change over the service life of the lamp) and/or a desired operating mode of the lamp, in such a way that color and/or brightness properties of the image are corrected or a desired color temperature or an optimal color balance or a particularly bright image is achieved. This is usually brought about by a corresponding shift in the phase of the AC lamp current with respect to the sequence of colors and white segments.

In a second embodiment, in addition or as an alternative thereto, the temporal length (duration) of the first current pulses can be changed, so that for the aforementioned purposes said pulses extend at least partially into an adjacent color or a white segment and/or on account of their changed duration produce a corresponding changed light intensity in the relevant color or white segment.

By contrast, the level (amplitude) of the first current pulses is preferably set or limited to a specific value in particular with regard to an optimal service life of the lamp, and is kept at least substantially constant. However, the possibility should not be ruled out that the amplitude of the first current pulses is also changed at least slightly as a parameter for influencing the color and/or brightness properties of the displayed image.

Finally, in a third embodiment, in addition or as an alternative to the aforementioned first current pulses, one or more additional second current pulses K (hereinafter referred to as compensation pulses) are superposed on the lamp current in one or more of the other color segments and/or possibly the white segment, in order in this way for example to improve the color temperature or adjust it almost completely without losses or to adapt the color saturation and/or the image brightness in a desired manner to an image content.

These second current pulses can also be adjusted in terms of their parameters such as in particular their amplitude and/or their temporal length and/or their temporal position relative to the production of the colors and/or white segments and/or possibly in terms of their polarity.

Figure 1:
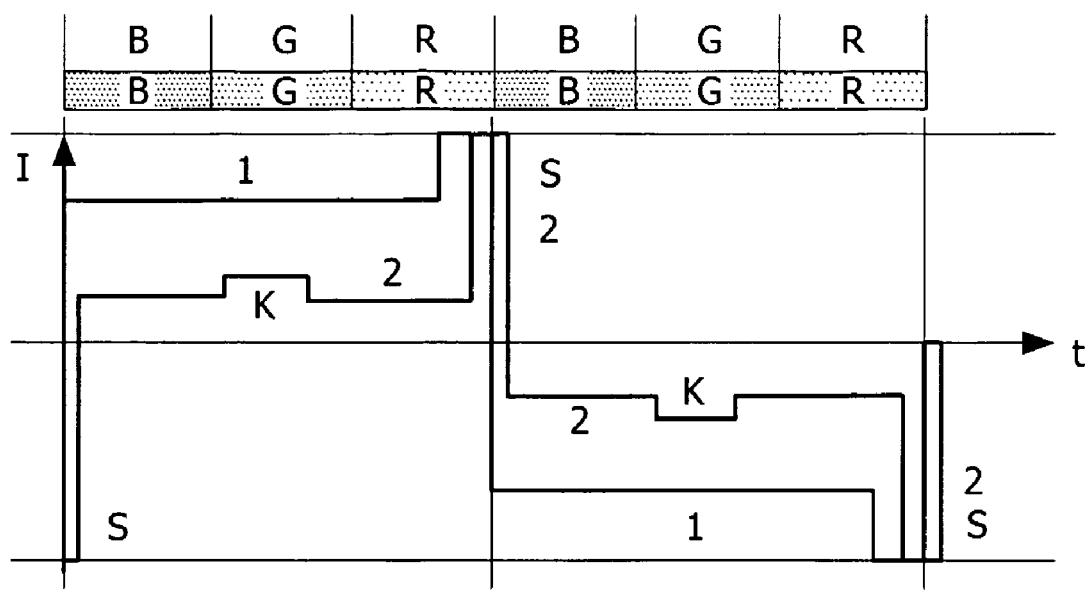
FIG. 1 shows temporal courses according to the invention of lamp currents in lamps of varying age.

The invention will firstly be explained with reference to a numerical example in conjunction with FIG. 1.

A typical high-pressure gas discharge lamp of for example 120 Watt and with a relatively short arc has in its brand new condition an operating voltage of approximately 58 Volts. For this operating voltage, the phase of the essentially square-wave AC lamp current is shifted relative to the primary color sequence produced by a color modulator of a display or projection system such that the first current pulses S superposed on the AC lamp current lie essentially entirely in each case in a red color segment R (red segment, red primary color image), as shown in the first current course 1 illustrated in FIG. 1.

The red color segment R is preferred because discharge lamps with a relatively low power in particular usually have a red component in the produced light which is too low for video applications.

The plateau value of the AC lamp current is for example approximately 2 Amps. The preferred amplitude of the first current pulses S is in this case approximately 2.6 Amps throughout the entire service life of the lamp. The temporal length (duration) of the first current pulses S should preferably be approximately 6 percent of the duration of the half-period of the AC lamp current, but it may also vary within the range between approximately 2 and approximately 15 percent. The longest useful duration is essentially determined by the type of display and the image display method.

For the minimum operating voltage (and thus the highest lamp current) at the start of the service life of the lamp, the duration of the first current pulses S is preferably set at the upper limit, in this case therefore at approximately 15 percent.

Hereinbelow, for the sake of simplification, it is to be assumed that there is no change or adaptation of the color temperature due to a corresponding change of the color modulator, such as for example the color segments on a color wheel, although this should not of course be ruled out.

Since, therefore, the first current pulses S lie entirely in the red color segments R, these must be displayed or projected in a correspondingly shortened manner in terms of time, in order to avoid color shifts. If an equal time duration for all three color segments B, G and R (that is to say in each case approximately 33 percent) is taken as the basis for a desired equal ratio of the three color intensities of 1:1:1, on account of the current pulse S for example a duration of the red segment R of approximately 31.3 percent and a duration of the green and blue segments G, B of in each case approximately 34.3 percent is to be set, in order to avoid color shifts on account of the first color pulses S.

Since the operating voltage usually increases over the service life of the lamp but the absolute value of the first current pulses S and the lamp power are to remain at least essentially constant for the reasons mentioned above, the relative level of the first current pulses S would increase on account of the correspondingly reduced lamp current. This in turn would mean that the color balance of the displayed image shifts towards red.

This is prevented for example in that the operating voltage is monitored and, if the value increases, part of each first current pulse S is shifted into the blue segment B so that the red color component is reduced and the blue color component is increased. In order also to correspondingly increase the green color component of the image, an additional, relatively small second current pulse (compensation pulse) K is furthermore produced during the green segment G. The resulting overall current course towards the end of the service life of the lamp is shown in FIG. 1 as curve 2.

In quantitative terms, the following numerical values are obtained for the second current course 2:

The operating voltage of the lamp towards the end of the service life is approximately 140 Volts, and the plateau value of the current is accordingly only approximately 0.7 Amps. The amplitude of the first current pulses S is still approximately 2.6 Amps. If the basis is assumed to be an unchanged temporal length of the red segment R of approximately 31.3 percent and of the green and blue segments of in each case approximately 34.3 percent, a number of parameters can be changed in order to compensate the increased relative level of the first current pulses S compared to the current plateau value (and the increased red component in the image caused thereby).

As already mentioned above, in particular the temporal length of the first current pulses S can be shortened from the maximum value of approximately 15 percent to for example approximately 5.7 percent. Furthermore, the temporal position of the first current pulses S can be changed such that part of each first current pulse S extends into the respectively adjacent blue segment B and for example of the 5.7 percent only approximately 3.4 percent still lie in the red segment R and approximately 2.3 percent lie in the blue segment B. As a third parameter, the green component of the produced light can be correspondingly increased by means of the aforementioned compensation pulses K with a current amplitude of approximately 0.9 Amps and a temporal length of approximately 21.8 percent of the half-period of the AC lamp current in the green segments G (cf. current course 2 in FIG. 1).

If the color modulator produces a white segment, a compensation pulse K can also be generated therein or the compensation pulse K generated in the green segment G can be partially shifted into the white segment.

These parameters may be selected and correspondingly adjusted individually or in combination with one another.

The adjustment of the above-described parameters of the first and second current pulses S, K in particular in terms of their amplitude and/or their temporal length and/or temporal position and possibly also their polarity, and the superposition thereof on the lamp current, are carried out by means of a circuit arrangement which comprises, in addition to a lamp driver, preferably a control unit which is connected to an image processor and programmed accordingly.

Figure 2:
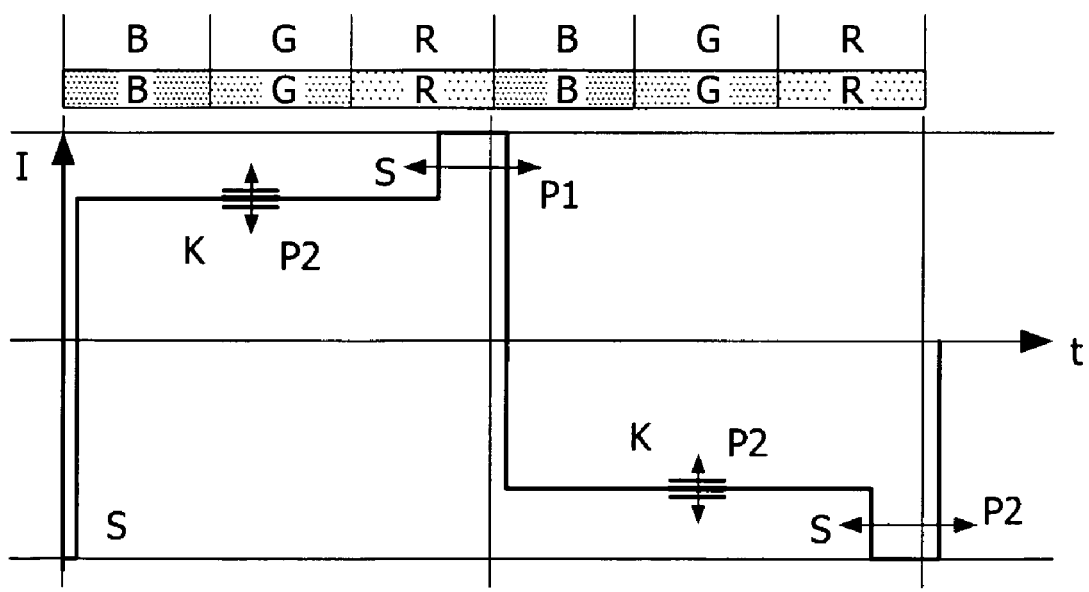
FIG. 2 shows a temporal course according to the invention of the lamp current for adjusting the color temperature of the displayed images.

FIG. 2 shows a course of the lamp current which is changed in order to achieve a desired color temperature of the displayed image. An increase or reduction in the color temperature can be brought about for example by shifting the temporal position of the first current pulses S from the respective red segment R into the blue segment B or vice versa, as shown by the double arrows P1 in FIG. 2. The correct white point can in this case be achieved by adjusting the amplitude and/or the polarity of compensation pulses K during the green segments G, as shown by the double arrows P2.

A change in the color temperature may alternatively or additionally also be effected by changing the temporal length of the first current pulses S.

It is furthermore possible to operate the circuit arrangement for generating the lamp current in connection with illuminating a projection display for example in two switchable operating modes. The first operating mode may serve for the video display of the produced images, in which colors which are as correct as possible are to be displayed and an intensive color saturation is to be achieved, whereas the second operating mode may be provided for presentation purposes, in which an image which is as bright as possible is desired.

Figure 3:
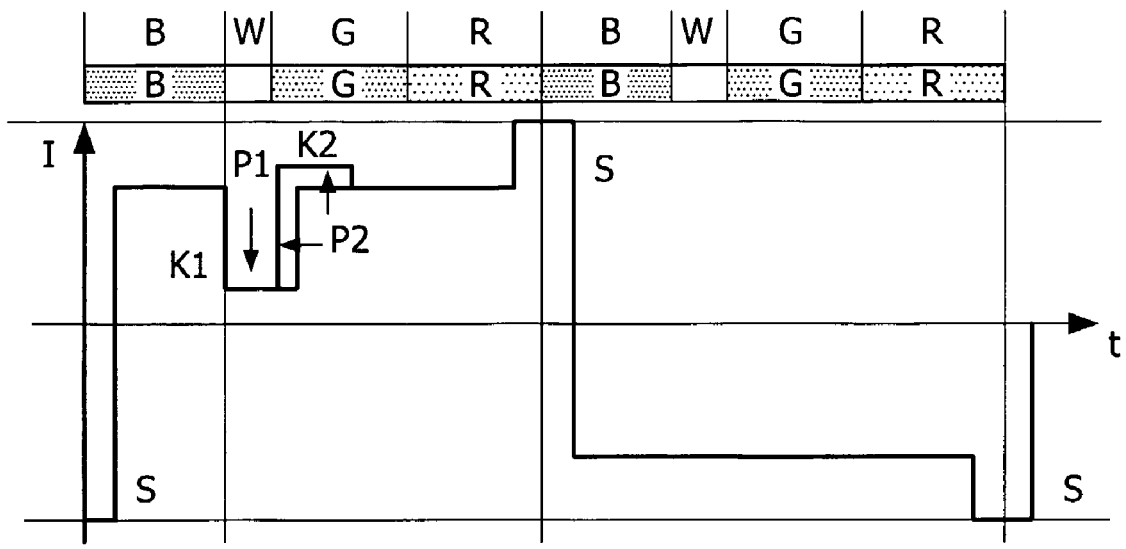
FIG. 3 shows a temporal course according to the invention of the lamp current for a first operating mode.
Figure 4:
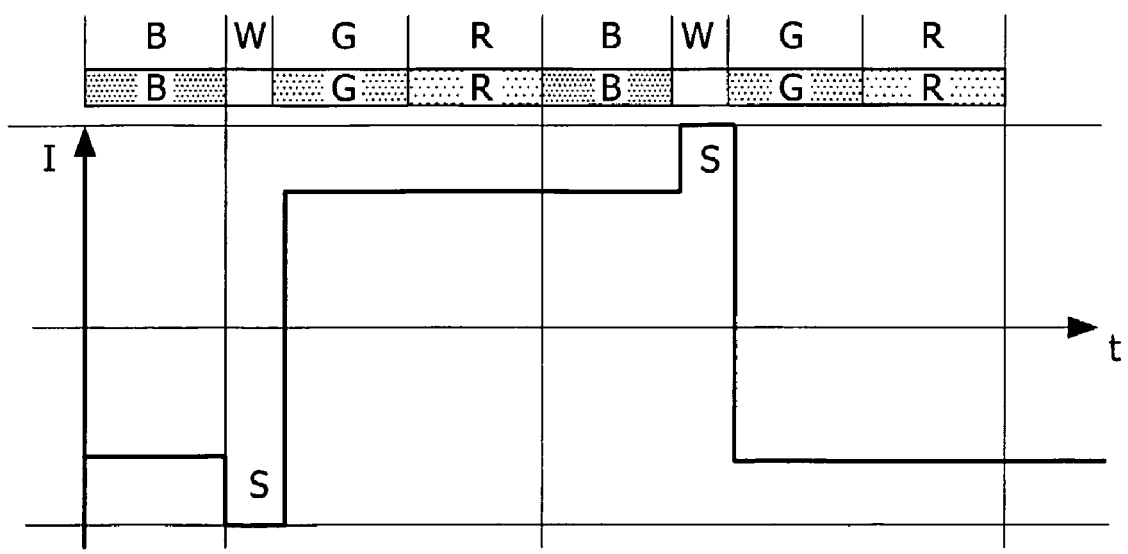
FIG. 4 shows a temporal course according to the invention of the lamp current for a second operating mode.

In this case, for example, a lamp current as shown in FIG. 3 is generated in the first operating mode and a lamp current as shown in FIG. 4 is generated in the second operating mode.

In the first operating mode, as shown in FIG. 3, the color temperature is once again adapted by suitably shifting the first current pulses S between the red and blue segments R, B as explained above in connection with FIG. 2.

In order to achieve a particularly good color saturation in the first operating mode, the lamp current may moreover be reduced in the form of negative first compensation pulses K1 as shown by arrow P1 during a white segment W in one or both half-periods of the AC lamp current.

Finally, as shown by arrows P2, if necessary second compensation pulses K2 can be generated in the green segment G with adjustable positive or negative polarity and/or temporal length, in order to increase or reduce the green light component and thus to bring about a desired color balance.

In the second operating mode, as shown in FIG. 4, the first current pulses S lie essentially entirely in the white segments W, so that the image has a relatively high brightness. In this case, any necessary correction of the color properties can be effected by means of at least one compensation pulse K in one of the color segments R, G, B as explained above.

In a further embodiment of the invention, the temporal position and/or temporal length and/or amplitude and/or possibly the polarity of the first and/or second current pulses (compensation pulses) S, K can be dynamically adjusted or adapted as a function of the displayed image content. This may be useful for example when, in the video mode, images having a relatively high brightness alternate with images having a relatively high color saturation. In order to optimize the display, a changeover is then automatically made to the second operating mode for particularly bright images and to the first operating mode for the other images. The changeover between the first and second operating modes may be activated by appropriate sensor signals or signals from the image processor.

In order to prevent the necessary compensation pulses K from becoming too great in the green segments G over the service life of the lamp on account of the shift of the first current pulses S from the red segments R to the blue segments B, the lamp current may be generated in such a way that, at the start of the service life, negative compensation pulses K lie in the green segments G and over the service life these return to a value of approximately zero and rise to only relatively low positive values towards the end of the service life.

In connection with the LCoS systems mentioned above, a further numerical example will be given to illustrate the invention:

In this case, as in the above embodiments, the amplitude of the first current pulses S is kept at least substantially constant and is for example 3.7 Amps. For a lamp power of 200 Watt and an operating voltage of approximately 115 Volts, a mean lamp current of approximately 1.74 Amps is obtained with a plateau current of approximately 1.63 Amps. This results in a relative ratio ppR between the amplitude of the first current pulses S and the level of the plateau current of 2.26. For a length of the first current pulses of 5 percent of the half-period of the AC lamp current, this means that approximately 6.3 percent more light is produced on account of the first current pulses and, if the first current pulses S lie entirely in the red segments R, an increased red component of the light of approximately 19 percent is brought about.

If then, for example, the operating voltage drops to approximately 75 Volts during the first 100 or so operating hours of the lamp, for the same lamp power (approximately 200 Watt) this results in a mean lamp current of approximately 2.67 Amps and a level of the plateau current of approximately 2.5 Amps. The relative ratio ppR between the amplitude of the first current pulses S and the level of the plateau current is thus reduced to a value of approximately 1.84. In order to compensate for the (smaller) amount of light additionally produced by the first current pulses S, the duration of said pulses is extended to a value of approximately 13 percent of the half-period of the AC lamp current, so that the same additional light intensity as in the case of the higher operating voltage is still obtained.

Figure 5:
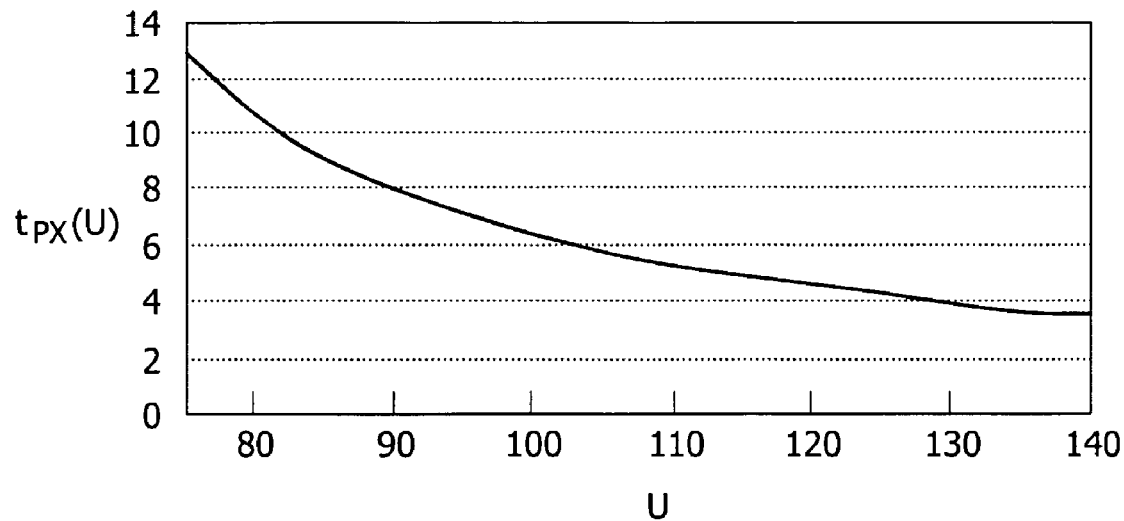
FIG. 5 shows the temporal length of first current pulses as a function of the operating voltage of the lamp.

If then, as the service life of the lamp increases, the operating voltage rises again, the duration of the first current pulses S is accordingly shortened so that the amount of additional light produced by the first current pulses S remains at least essentially constant. FIG. 5 shows such a course of the temporal duration $t_{px}$ of the first current pulses S as a function of the operating voltage U.

Figure 6:
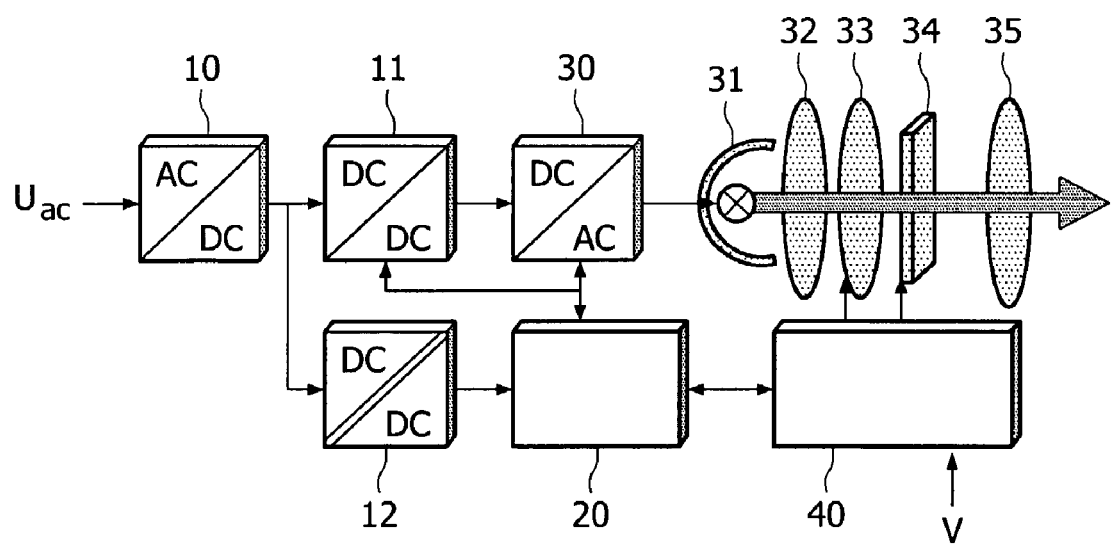
FIG. 6 shows a schematic block diagram of a circuit arrangement for operating a high-pressure discharge lamp.

FIG. 6 finally shows a schematic block diagram of one embodiment of a circuit arrangement for generating the above-described lamp currents for a discharge lamp 31, and also essential components of a projection system.

An AC voltage $U_{ac}$ of for example approximately 100 to 240 Volts is present at the input of the circuit arrangement, and this AC voltage is converted into an AC lamp voltage having the above-described courses.

The circuit arrangement comprises a rectifier stage 10, a power/current regulator 11, a voltage converter 12, a control unit 20, a commutator with ignition stage 30 and an image processor 40, wherein a video/graphics signal V for image production is present at the image processor.

The AC voltage $U_{ac}$ is converted into a DC voltage by the rectifier stage 10. From this DC voltage, a DC current having a current level suitable for the relevant discharge lamp 31 is produced by the power/current regulator 11, and said DC current is superposed with the above-described first and second current pulses S, K. To this end, the power/current regulator 11 is appropriately controlled by the control unit 20.

The DC current produced is converted by the commutator 30 into an essentially square-wave AC lamp current having a frequency and phase controlled by the control unit 20.

The voltage converter 12, which is fed by the rectifier stage 10, serves to supply power to the power/current regulator 11.

The projection system is composed essentially of the discharge lamp 31, an optical integrator 32, a color modulator 33, a display 34 and a lens system 35. The color modulator 33 and the display 34 are actuated in a known manner by the image processor 40 as a function of the video/graphics signal V present at the latter.

The control unit 20 and the image processor 40 are connected to one another via a communication link and synchronized and designed in such a way that the generation of the first and second current pulses by the power/current regulator 11 and the commutation of the DC current by the commutator 30 take place in temporal relation to the production of the colors and white segments in the manner described above.

The control unit 20 and/or the image processor 40 furthermore serve to change the amplitude and/or the temporal length and/or the temporal position and/or possibly the polarity of the first and second current pulses S, K such that the above-described color and/or brightness properties of the displayed image are achieved or corrected, and possibly also to switch between the aforementioned operating modes. The control unit 20 and/or the image processor 40 are appropriately programmed for this purpose and are provided with a memory in which there is stored for example the temporal duration of the first current pulses S as a function of the operating voltage U of the lamp, as shown in FIG. 5.

The invention claimed is:

1. A method of operating a high-pressure gas discharge lamp in a system for time-sequential production of colors suitable for synthesis of an image to be displayed, the method comprising the steps of:
    superposing a lamp current with one or more first current pulses having a polarity identical to a polarity of the lamp current to be changed, wherein the lamp current is an AC current and the first current pulses are generated prior to a change in the polarity of the lamp current; and adjusting the first current pulses with regard to their amplitude and/or temporal length and/or temporal position relative to the production of the colors and/or white segments of the image, wherein the temporal position of the first current pulses is adjusted by shifting phase of the lamp current.

2. A method as claimed in claim 1, further comprising generating at least one second current pulse and superposing said at least one second current pulse on the lamp current, thereby altering color and/or brightness properties of the image.

3. A method as claimed in claim 2, wherein the step of generating said at least one second current pulses comprises a change in their polarity and/or amplitude and/or temporal length and/or temporal position relative to the production of the colors and/or white segments.

4. A method as claimed in claim 1, wherein the temporal position of the first current pulses is kept substantially constant and a change or correction of the color and/or brightness properties of the displayed image takes place by adjusting the amplitude and/or the temporal length of the first current pulses relative to the production of the colors and/or white segments.

5. A method as claimed in claim 1, comprising a first operating mode for displaying images with a relatively high color saturation, in which a second current pulse with a negative amplitude compared to the present polarity of the lamp current is superposed on the lamp current during at least one white segment.

6. A method as claimed in claim 5, comprising a second operating mode for displaying images with a relatively high brightness, in which the first current pulse is superposed on the lamp current during at least one white segment.

7. A method as claimed in claim 6, further comprising changing over between the first and second operating modes based at least in part on color saturation and/or brightness parameters of the image.

* * * * *